United States Patent [19]

Hentschke

[11] Patent Number: 4,531,151
[45] Date of Patent: Jul. 23, 1985

[54] SYSTEM FOR THE REDUNDANCY-REDUCING DIGITAL TRANSMISSION OF TELEVISION VIDEO SIGNALS

[75] Inventor: Siegbert Hentschke, Tamm, Fed. Rep. of Germany

[73] Assignee: International Standard Electric Corporation, New York, N.Y.

[21] Appl. No.: 476,670

[22] Filed: Mar. 18, 1983

[30] Foreign Application Priority Data

Mar. 27, 1982 [DE] Fed. Rep. of Germany ....... 3211323

[51] Int. Cl.³ .......................... H04N 7/13; H04N 9/02
[52] U.S. Cl. ...................................... 358/135; 358/13; 358/138; 375/27
[58] Field of Search ................ 358/133, 135, 138, 13; 375/27

[56] References Cited

U.S. PATENT DOCUMENTS 2,921,124   1/1960   Graham .............................. 358/138

Primary Examiner—Howard W. Britton
Attorney, Agent, or Firm—John T. O'Halloran; Jeffrey P. Morris

[57] ABSTRACT

When television signals are transmitted digitally over PCM networks, it is sometimes necessary to reduce the bit rate of video signals, such as chrominance signals, on the transmission path from the rate given by the sampling frequency without significantly impairing the picture quality. To accomplish this, the transmitting portion of the novel transmission system includes a transmit filter (FIG. 2) which, at every other sample value in the horizontal and vertical directions of the picture, transmits a numerical value (C) which has the same number of bits as the sample values and depends on this sample value and the sample values of surrounding picture elements, and the receiving portion includes a receive filter (FIG. 3) in which the values of the picture elements to be inserted between the transmitted picture-element values are calculated from the values received for the surrounding picture elements. The digital filtering is performed jointly by the transmit filter and the receive filter in such a way that the horizontal and vertical resolutions are substantially preserved, and that only the diagonal resolution is reduced. An inexpensive realization is given for the two filters.

8 Claims, 5 Drawing Figures

SYSTEM FOR THE REDUNDANCY-REDUCING DIGITAL TRANSMISSION OF TELEVISION VIDEO SIGNALS

The present invention relates to a system for digitally transmitting picture signals, particularly television video signals, at a bit rate reduced on a transmission path, and wherein the system includes a transmission of a bit group only in place of every other sample value present in an array of rows and columns representing a picture; and furthermore, wherein the system includes a receiving portion which includes circuitry for reconstruction from the transmitted bit groups of sample values in place of which no information was transmitted.

A system of this kind is disclosed in DE-OS 31 04 439. There, at every other 8-bit sample value in the horizontal and the vertical direction, this sample value and a 2-bit control signal dependent on the environment of that sample value, i.e., a group of 10 bits, are transmitted, so that the bit rate on the transmission path is reduced by 8:5. At the receiving end, the lacking sample values are approximatively reconstructed from the transmitted sample values and the control information, i.e., from the transmitted bit groups.

For many applications, an 8:5 reduction of the bit rate is not suitable or not sufficient. If a digital television transmission system, for example, is to use the transmission paths of existing or planned digital communication networks, the bit rate of the digital picture signal cannot be selected primarily from the point of view of transmission quality but must be adapted to the predetermined bit rates of the network. It is sometimes necessary to reduce the bit rate of the digital picture signals on the transmission path to half the rate determined by the sampling frequency.

Accordingly, the object of the invention is to provide a system of the above kind which reduces the bit rate of the digital picture signals on the transmission path to one half without significantly impairing the quality of the transmitted pictures. The amount of circuitry required at the transmitting and receiving ends is to be kept within reasonable limits.

This object is attained as set forth in claim 1. Advantageous aspects and preferred embodiments are apparent from the subclaims.

It should be pointed out that the filtering of picture signals to influence the resolution of the picture is not new per se. From a publication by B. Wendland, "Konzepte für ein kompatibles Hifi-Fernsehsystem", NTG-Fachberichte, Vol. 1974, Text- und Bildkommunikation, Sept. 1980, it is known that, by introducing a diagonal sampling pattern ("offset sampling"), horizontal resolution can be improved by a factor of 2 if all sample values are transmitted and if the frequency band is suitably limited in the diagonal direction.

In the invention, however, the diagonal sampling pattern and the diagonal limitation of the frequency band are used to prevent any significant degradation of the picture if the number of transmitted digital values is halved. According to the invention, the filtering is performed so that the horizontal and vertical resolutions are substantially preserved, and that only the resolution in the two diagonal directions of the picture is reduced.

The invention is preferably applicable to the chrominance signals U and V, also called "color-difference signals", of the color-television picture. According to CCIR Recommendation AA/11, Document No. 11/398-E of Oct. 5, 1981, for color television transmission, each of these chrominance signals U and V is to be sampled at 6.75 MHz and encoded with 8 bits per sample value. It is desirable to unite all television signals (including audio signals) into a 140-Mb/s multiplex signal that can be transmitted in one PCM channel of the fourth hierarchical level of the PCM network. This presents the problem of halving the bit rate of the chrominance signals on the transmission path without significantly impairing the picture quality.

However, the invention is not limited to the chrominance signals but can also be applied to the luminance signal of the color television picture.

The invention will now be explained in more detail, by way of example, with reference to the accompanying drawings, in which.

Figure 1:
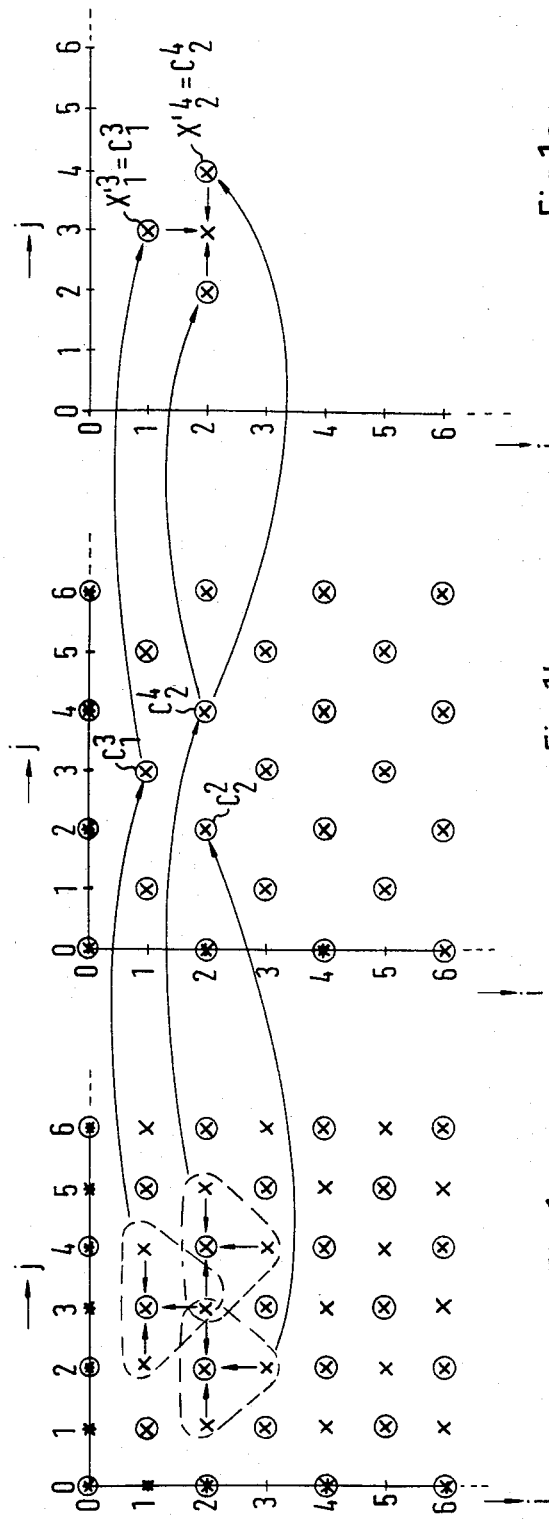
FIGS. 1a, 1b and 1c illustrate the principle of the digital filtering in the system according to the invention using transformations in the sampling pattern of the signal to be filtered.

If, in the sampling pattern of the picture signal to be processed, e.g., of the chrominance signal U, the columns are denoted by the index j, the rows by the index i, the original sample values by $X_i^j$, the transmitted values by $C_i^\mu$, the values reconstructed at the receiving end by $X'_i^j$, the operation of the transmit filter can be represented as follows:

$$C_{2i}^{2j} = \tfrac{1}{8} X_{2i}^{2j-1} + \tfrac{1}{2} X_{2i}^{2j} + \tfrac{1}{8} X_{2i}^{2j+1} + \tfrac{1}{4} X_{2i+1}^{2j} \quad (1)$$

$$C_{2i+1}^{2j+1} = \tfrac{1}{8} X_{2i+1}^{2j} + \tfrac{1}{2} X_{2i+1}^{2j+1} + \tfrac{1}{8} X_{2i+1}^{2j+2} + \tfrac{1}{4} X_{2i+2}^{2j+1} \quad (2)$$

$$C_{2i+1}^{2j} = C_{2i}^{2j+1} = 0 \quad (3)$$

This means that in each row and each column, a value different from zero is calculated and transmitted only in place of every other sample value $X_i^j$, and this value is equal to a sum of fractions of this sample value and sample values of picture elements surrounding this sample value. To be exact, this sum consists of half the sample value in place of which it is transmitted, one eighth of the sample value of the next picture element to the left, one eighth of the sample value of the next picture element to the right, and one quarter of the sample value of the picture element below that sample value. The summation is illustrated in FIG. 1a, where the sample values in place of which such a sum is transmitted are designated by a circle. The sum is transmitted in the form of a bit group consisting of the same number of bits as the original sample values, i.e., of eight bits, and in place of the sample values not encircled, no information is transmitted, which is shown in FIG. 1b. The bit rate of the processed picture signal is thus reduced to one half.

In a filter at the receiving end, the picture elements in the original sampling pattern are approximatively reconstructed as shown in FIG. 1c, according to the following transformations:

$$X'^{2j}_{2i} = C^{2j}_{2i} \quad (5)$$

$$X'^{2j+1}_{2i+1} = C^{2j+1}_{2i+1} \quad (6)$$

$$X'^{2j+1}_{2i} = \tfrac{1}{4} C^{2j}_{2i} + \tfrac{1}{4} C^{2j+2}_{2i} + \tfrac{1}{2} C^{2j+1}_{2i-1} \quad (7)$$

-continued
$$X^{2j}_{2i+1} = \tfrac{1}{4} C^{2j-1}_{2i+1} + \tfrac{1}{4} C^{2j+1}_{2i+1} + \tfrac{1}{2} C^{2j}_{2i} \qquad (8)$$

This means that the transmitted bit groups $C_{2i}{}^{2j}$ and $C_{2j+1}{}^{2j+1}$ are identically adopted at the corresponding picture elements, and that the intermediate picture elements are calculated as sums of fractions received for adjacent picture elements. To be exact, the value for a picture element to be inserted is the sum of half the numerical value received for the picture element above that element, one quarter of the numerical value received for the next picture element to the left, and one quarter of the numerical value received for the next picture element to the right. FIG. 1c illustrates this by the example of the reconstruction of the picture element $X'_2{}^3$. The operation to be performed at the edge of the picture will not be dealt with here. There are a number of ways to provide the filter with values equivalent to the values which are needed but unavailable for the transformations, such as the cyclic use of values or the prestoring of suitable values. The approach to be chosen will depend for the most part on the subjective picture sensation the viewer is to have.

Simulations have shown that the digital filtering described, to which the transmitted picture is subjected by the combination of the transmit filter and the receive filter, reduces the limiting frequency for image structures in the diagonal directions by a factor of about 2, while the limiting frequency for image structures in the horizontal and vertical directions is reduced only negligibly. This means that the resolution in the diagonal directions is reduced by the same factor, while the horizontal and vertical resolutions are reduced only slightly. Such a tradeoff of picture quality for a reduction of the bit rate to one half is definitely acceptable, because the diagonal resolution of the original picture is better than the horizontal and vertical resolutions, anyway.

Figure 2:
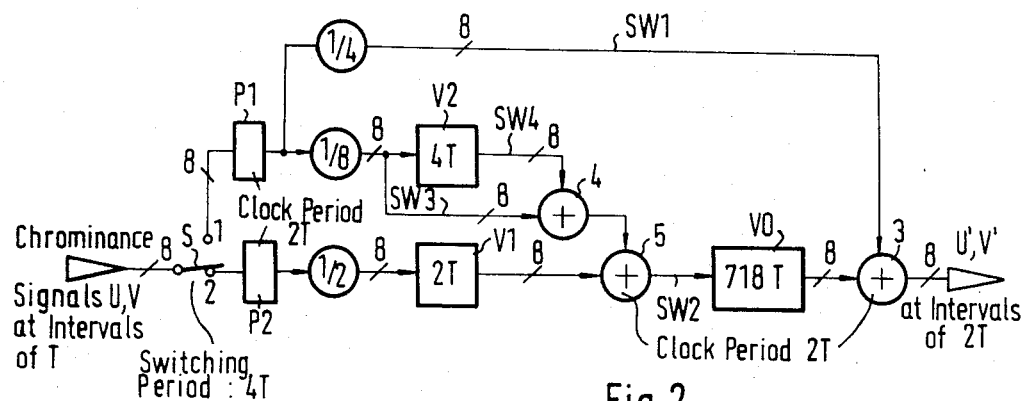
FIG. 2 is a block diagram of the transmit filter.
Figure 3:
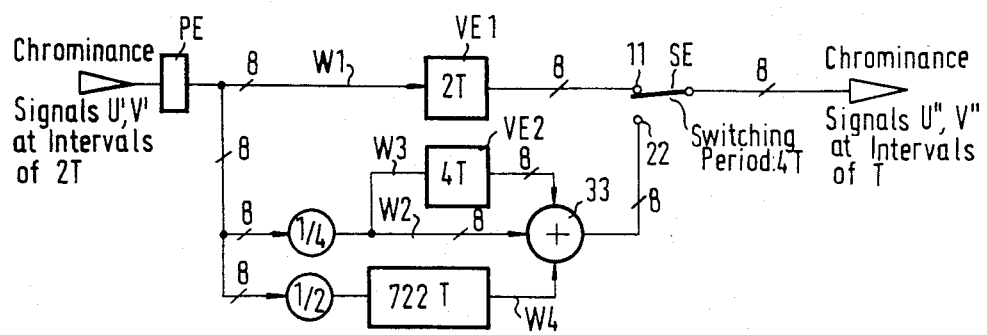
FIG. 3 is a block diagram of the receive filter.

The realization of the transmit and receive filters with the properties described will now be explained with the aid of FIGS. 2 and 3.

To keep the amount of circuitry required at the transmitting and receiving ends to a minimum, the transmit filter and the receive filter are used in a time-division multiplex mode to filter the two chrominance signals U and V. The sample values of the two chrominance signals thus arrive at the input of the transmit filter of FIG. 2 alternately at intervals of T, which is half the sampling period of each individual signal. By means of a switch S, the incoming sample values can be transferred to a terminal 1 or a terminal 2 of the transmit filter. The switch is operated at intervals of 4T so as to transfer two incoming sample values at a time to the terminal 1, and two subsequently incoming sample values at a time to the terminal 2. From the terminals 1 and 2, the sample values are transferred to buffers P1 and P2, which are read from at intervals of 2T, i.e., at the sampling rate. Accordingly, the following holds for each chrominance signal:

The sample values arriving at intervals of 2T appear alternately at the output of P1 and the output of P2 at intervals of 4T; in the middle of the period between two sample values of one of the chrominance signals, there appears a sample value of the other chrominance signal. As shown in Fig. 1a, the sample values X in place of which a bit group C is transmitted are staggered from one row to the next by one sampling period, i.e., bit groups C are transmitted at the even-numbered sample values in one row, and at the odd-numbered sample values in the next.

This different treatment of the sample values of successive rows is accomplished by either choosing an odd number of sample values per row or, with an even number of sample values per row, shifting the phase of the switching signal for the switch S at the beginning of each new row by half a switching period, i.e., by one sampling period.

From this it follows that in FIG. 1a, the sample value $X_3{}^2$, for example, appears at the same terminal as the sample values $X_2{}^3$ and $X_2{}^1$, whereas the sample value $X_2{}^2$ 2 appears at the other terminal, and that relative to the instant of the appearance of $X_3{}^2$, the sample values $X_2{}^3$ and $X_2{}^1$ appear, respectively, one line period less one sampling period and one line period plus one sampling period earlier, while the sample value $X_2{}^2$ 2 appears one line period earlier.

These values must thus be delayed by the aforementioned time differences with respect to $X_3{}^2$.

Accordingly, the transmit filter has four signal paths SW1 to SW4, and the values in the signal paths SW1 to SW3 are delayed by these time intervals with respect to the value in the signal path SW1. The values in the signal paths are multiplied by suitable factors and added in accordance with equations (1) and (2) to obtain the value to be transmitted. The four signal paths are as follows:

From the terminal 1 or the output of the buffer P1, a first signal path SW1, in which the sample values are divided by four, leads to an output adder 3. (Since the sample values are each processed in the form of eight parallel bits, such a division is a simple shift operation).

In a second signal path SW2, leading from the terminal 2 to the output adder 3, the sample values are divided by two and delayed by one line period. This delay is achieved with two delay lines, a first delay line V1 providing a delay equal to one sampling period 2T, and a second delay line V0 providing a delay equal to one line period less one sampling period, i.e., to 718T if a line has a duration of 720T (720 sample values per line). Connected between the first delay line V1 and the second delay line V0 is an adder 5. A third signal path SW3 leads from the terminal 1 or the output of the buffer memory P1 via an adder 4, the adder 5, and the delay line V0 to the output adder 3, in which the sample values are divided by eight and delayed by one line period less one sampling period, i.e., by 718T. In a fourth signal path SW4, leading from the terminal 1 to the output adder 3, the sample values are divided by eight and delayed by 722T, i.e., by one line period plus one sampling period.

In the third signal path, the output of the divide-by-8 stage is connected directly to the adder 4, while in the fourth signal path, a delay stage V2 is inserted which provides a delay equal to two sampling periods, i.e., to 4T. The output value of the adder 4 is fed to the adder 5, whiwch delivers three of the four quantities used to form the desired sum according to equations (1) and (2) to the output adder 3.

After a time of 2T, the filter processes a group of sample values of the other chrominance signal in similar fashion, and after another period of 2T, it processes the next group of sample values of the same chrominance signal, so that the values of the two chrominance signals appear at the filter ouptut at twice their interval T at the filter input.

The receive filter of FIG. 3 works as follows: At the input, the output values of the transmit filter for the two chrominance signals U and V appear alternately at intervals of 2T. They are transferred at intervals of 2T into a buffer PE, from which they are read at such a rate that after two values of U and V separated by T at the output, an interval of 3T follows until the next value of U, i.e., the interval between pairs of successive values U and V is reduced from 2T to T, so that a gap is obtained for inserting two values separated by T, too. From the output of tne buffer PE, a first signal path W1 delay stage VE1, which provides a delay of one sampling period 2T, to a first terminal 11 of a switch SE, whose second terminal 22 is connected to the output of an adder 33. The switch SE is switched between the two terminals 11 and 22 at intervals of 4T, so that it transfers two values from the first signal path W1 to the output of the receive filter during the first half of the switching period, and two output values of the adder 33 during the second half. Thus, two calculated values are inserted between every two successively received values for U and V.

A second signal path W2 leads from the output of the buffer via the adder 33 to the second terminal 22 of the switch SE; in this path, the received values are divided by four. In a third signal path W3, leading from the output of the buffer via the adder 33 to the second terminal 22 of the switch SE, the received values are divided by four and delayed by two sampling periods, i.e., by 4T. This signal path W3 is formed by connecting a delay stage VE2 in parallel with the connection from the output of the divide-by-four stage to the input of the adder 33.

In a fourth signal path W4, leading from the output of the buffer PE via the adder 33 to the second terminal 22 of the switch SE, the received values are divided by 2 and delayed by one line period plus one sampling period, i.e., by 722T.

If, for example, a received value for the chrominance signal U is applied to the terminal 11 of the switch SE at an instant $t_0$, and the switch SE is in the "upper" position shown, this received value will be transferred to the output at the instant $t_0$. Half a sampling period later, i.e., at the instant $t_0+T$, the switch SE will still be in the "upper" position, and the next received value, which belongs to the other chrominance signal, will be transferred to the output. At the later instant $t_0+2T$, the switch SE will be changed over to the other terminal 22. At the same time, the output of the buffer will provide the next received value, which belongs to the chrominance signal U again. If this is the value $C_2^4$ of FIG. 1c, for example, the values $\frac{1}{4}C_2^4$, $\frac{1}{4}C_2^2$, and $\frac{1}{4}C_1^3$ are simultaneously applied to the inputs of the adder 33, and at this instant $t_0+2T$, the sum of these values will be transferred as the output value $X_2^3$ of the chrominance signal U to the output. At the following instant $t_0+3T$, the switch SE will still be in this "lower" position and transfer the correspondingly formed sum value as the next output value of the chrominance signal V to the output. At the instant $t_0+4T$, the switch will be changed back to the "upper" position, and the entire sequence is repeated.

Hence it follows that the filter output values U'' and V'' are separated at the same time intervals T and have the same succession as the sample values U and V at the input of the transmit filter.

I claim:

1. In a system including a transmitter and a receiver, the system providing for communication of pictorial data between the transmitter and the receiver, and wherein the data of a picture is arranged as sample values in a two-dimensional array comprising rows and columns, said communicating being accomplished at reduced bandwidths by transmission of only sample signals corresponding to alternate ones of said sample values in each of successive rows of said array, the improvement wherein:

the transmission of sample signals also corresponds to alternate ones of said sample values in each of successive columns of said array, and wherein each sample signal is formed as a composite of sample values neighboring the corresponding sample value in said array;

said system comprising: a transmit filter including first selecting means at said transmitter responsive to a sequence of sample values read out of said array for selecting a set of predesignated neighboring sample values, and first combining means for combining the sample values of said set to produce a sample signal, said selecting means and said combining means operating in an interated fashion to produce a succession of sample signals for transmission to said receiver; and a receive filter including second selecting means at said receiver responsive to a sequence of sample signals received from said transmitter for selecting a set of individual sample signals from a sequence of the sample signals, and second combining means for combining the sample signals of the set of sample signals to produce a corresponding sample value in an array of sample values for reconstruction of said picture at said receiver.

2. A system as claimed in claim 1 wherein said system digitally communicates picture signals, particularly television video signals, at a reduced bit rate on a transmission path between said transmitter and said receiver, and wherein the transmitter transmits a bit group only in place of every other sample value in horizontal and vertical directions of the picture, and wherein said receiver provides for the approximate reconstruction from the transmitted bit groups of sample values which were not communicated between said transmitter and said receiver, said transmit filter and said receive filter operating digitally;

said system being further characterized in that the bit group transmitted by the transmit filter (FIG. 2) in place of every other sample value ($X_{2i}^{2j}$) in the horizontal and vertical directions represents a numerical value of ($C_{2i}^{2j}$) equal to the sum of fractions of said sample value ($X_{2i}^{2j}$) and sample values of picture elements surrounding said sample value, and that the picture elements ($X'_{2i}^{2j+1}$) to be inserted in the received picture between the picture elements in place of which bit groups were transmitted are calculated by the receiver filter as sums of fractions of numerical values received for adjacent picture elements (FIG. 1).

3. A system as claimed in claim 2, characterized in that the sum ($C_{2i}^{2j}$) transmitted by the transmit filter consists of half the respective sample value ($X_{2i}^{2j}$), one eighth of the sample value of the next element to the left ($X_{2i}^{2j-1}$), one eighth of the sample value of the next element to the right ($X_{2i}^{2j+1}$), and one quarter of the sample value lying below said value ($X_{2i+1}^{2j}$), and that the sum ($X'_{2i}^{2j+1}$) calculated by the receive filter for a picture element to be inserted consists of half of the numerical value of the received bit group of the picture element lying above said element ($C_{2i-1}{}^{2j-1}$), one quarter of the numerical value of the received bit group of the next picture element to the left ($C_{2i}{}^{2j}$), and one quarter of the numerical value of the received bit group of the next picture element to the right ($C_{2i}{}^{2j+2}$).

4. In a system as claimed in claim 3, wherein said receive filter is characterized in that said receive filter has a switch (SE) which alternately transfers a received numerical value and a calculated numerical value of the filtered picture signal to the filter output, that a first terminal (11) of the switch (SE) is connected to the input of the receive filter via a signal path (SW1) in which the received numerical values are delayed (VE1) by one sampling period, and that a second terminal (22) of the switch (SE) is connected to the output of an adder (33) whose input values are the numerical value divided by four, the numerical value divided by four and delayed by two sampling periods, and the numerical value divided by two and delayed by one line period plus one sampling period.

5. In a system as claimed in claim 4, wherein either one of said receive and said transmit filters is used to filter two like signals (U, V) in a time-division multiplex mode.

6. In a system as claimed in claim 3, wherein said transmit filter is characterized in that said transmit filter has an input switch (S) which transfers the sample values to be filtered to a first terminal (1) and a second terminal (2) in turn, that it has an output adder (3) by which the bit groups formed by filtering are delivered at intervals of two sampling periods of the signal to be filtered and simultaneously with the "on" states of the first terminal (1), that the first terminal (1) is connected to the output adder (3) via a first signal path (SW1) in which the transferred sample values are divided by four, that the first terminal (1) is connected to the output adder (3) via a third signal path (SW3) in which the transferred sample values are divided by eight and delayed (V0) by one line period less one sampling period, and via a fourth signal path (SW4) in which they are divided by eight and delayed (V0,V2) by one line period plus one sampling period, and that the second terminal (2) is connected to the output adder (3) via a second signal path (SW2) in which the transferred sample values are divided by two and delayed (V1, V0) by one line period.

7. In a system as claimed in claim 6, wherein said transmit filter is characterized in that the delay by one line period in the second signal path (SW2) is produced in two delay lines the first of which (V1) provides a delay equal to one sampling period, and the second of which (V0) provides a delay equal to one line period less one sampling period, that the delay in the third signal path (SW3) is produced in said second delay line (V0), and that the delay in the fourth signal path (SW4) is produced in a delay line (V2) providing a delay equal to two sampling periods in said second delay line (V0).

8. In a system as claimed in claim 7, wherein said transmit filter is characterized in that the sample values of the third signal path (SW3), which are not delayed and are divided by eight, and the sample values of the fourth signal path (SW4), which are delayed by two sampling periods (V2) and divided by eight, are added together in a first adder (4), and that the sum values thus obtained are added, in a secondadder (5) inserted in the second signal path (SW2) between the first delay line (V1) and the second delay line (V0), to the sample values of the second signal path (SW2) appearing at the output of the first delay line (V1), which were divided by two and delayed by one sampling period.

* * * * *